(12) United States Patent
Lawrence (10) Patent No.: US 6,675,562 B2
(45) Date of Patent: Jan. 13, 2004

(54) PORTABLE MODULAR IMPLEMENT SYSTEM

(76) Inventor: Robert C. Lawrence, 12 Clovelley Way, Asheville, NC (US) 28802

( * ) Notice: Subject to any disclaimer, the term of this patent is extended or adjusted under 35 U.S.C. 154(b) by 60 days.

(21) Appl. No.: 10/078,775

(22) Filed: Feb. 19, 2002

(65) Prior Publication Data

US 2003/0154703 A1 Aug. 21, 2003

(51) Int. Cl.$^7$ .............................................. A01D 34/00
(52) U.S. Cl. ................................................ 56/2; 56/16.9
(58) Field of Search ......................... 56/2, 16.9, 10.8

(56) References Cited

U.S. PATENT DOCUMENTS

| | | | | |
|---|---|---|---|---|
| 3,875,515 A | * | 4/1975 | Stuart et al. ............... 375/232 |
| 3,883,794 A | | 5/1975 | Sively ........................ 322/41 |
| 4,010,377 A | | 3/1977 | McKenzie .................. 290/1 R |
| 4,152,882 A | * | 5/1979 | Howard ...................... 56/13.7 |
| 4,217,537 A | | 8/1980 | Hamm ........................ 320/56 |
| 4,242,855 A | * | 1/1981 | Beaver, Jr. .................. 56/13.7 |
| 4,539,483 A | | 9/1985 | Freeny ....................... 290/1 R |
| 4,653,254 A | | 3/1987 | Qualls ........................ 56/16.9 |
| 4,821,959 A | * | 4/1989 | Browing ..................... 239/121 |
| 4,870,811 A | | 10/1989 | Steele ........................ 56/10.5 |
| 5,775,074 A | * | 7/1998 | Walter ........................ 56/11.9 |
| 5,965,999 A | * | 10/1999 | Frank ........................ 322/1 |
| 6,169,345 B1 | | 1/2001 | Bloch et al. ............... 310/67 R |
| 6,359,344 B1 | * | 3/2002 | Klein et al. ................ 290/1 A |

FOREIGN PATENT DOCUMENTS

EP  0 971 142  1/2000

* cited by examiner

Primary Examiner—Robert E. Pezzuto
Assistant Examiner—Meredith Petravick
(74) Attorney, Agent, or Firm—Joseph T. Guy; Nexsen Pruet Jacobs & Pollard, LLC (57) ABSTRACT

A portable modular implement system is described. The system comprises a power source which comprises a motor. The motor comprises a crank shaft with an upper end and a lower end. A casing is attached to the motor exterior to the upper end of the crankshaft. The casing further comprises a void. An implement assembly comprising an implement bracket is reversibly attached to the power source. An implement is attached to the implement bracket. The implement comprises an implement drive shaft wherein the implement drive shaft protrudes through the void and couples with the crankshaft below the casing when the implement bracket is attached to the power source.

27 Claims, 6 Drawing Sheets

PORTABLE MODULAR IMPLEMENT SYSTEM

TECHNICAL FIELD

The present invention is related to a portable modular implement system, such as a generator, alternator, or fluid pump which has an implement assembly which is reversibly coupled to the crank shaft of a motor as commonly employed in mowers and the like.

BACKGROUND

Motor driven devices are well known and widely available for many different functions. Particularly, motor driven mowers, generators, alternators and fluid pumps are employed wherein the crank shaft of the motor is coupled with an implement thereby energizing the implement for the task at hand.

It is most common for an implement to have, integral thereto, a motor wherein the motor and implement are coupled by belts and pulleys. For example, electrical generators typically are provided as a single machine wherein a motor and dynamo are integral thereto. As well known to those in the art the inclusion of a motor with an implement increases the cost of the commercial product. Furthermore, many implements are only used seasonally or during a crisis. Maintaining the motor is often overlooked until use of the implement is required. This has led to a long felt desire to provide implements which can share a motor thereby decreasing the cost of additional implements.

Devices wherein the lower end of the shaft of a motor are capable of coupling with multiple implements are well known. This type of a device has advantages yet they typically require dismantling of at least part of one implement to accommodate the other.

U.S. Pat. No. 4,217,537, for example, provides a generator which is driven by a chain saw. The operator can utilize the chain saw for the intended purpose and then convert the chain saw to a generator if needed. This eliminates the need for two motors and decreases the total cost of a chain saw and generator relative to the cost of single function implements. One disadvantage is the requirement that the chain saw be at least partially dismantled which is an obvious inconvenience to the user.

U.S. Pat. No. 4,010,377 provides a combination generator and boat propulsion system. The generator is attached between the lower end of the crank shaft of the motor and the power receiving portion of the boat propulsion system. While this device may be useful in certain environments the utility is somewhat limited.

Devices which utilize the upper end of the crank shaft are known. For example, U.S. Pat. Nos. 4,242,855 and 4,653,254 describe lawn mowers adapted with devices where the crank shaft protrudes beyond the casing. The protruding crank shaft is coupled to various devices in a manner analogous to the lower end of the crank shaft. These have not been widely accepted due, in part, to the safety problems associated with a protruding spinning element on top of the mower. If the implement is removed the rotating crank shaft is a safety hazard. Furthermore, the motor must be modified to have a crank shaft which protrudes exterior to the casing which increases the manufacturing expense of the motor.

The ability to modify an existing mower to accommodate various implements has never been adequately accomplished in the art. Particularly absent is a system wherein the mower can function alone without regard for the implement yet readily and reversibly receive an implement as needed. This must be accomplished without increasing the risk factors associated with the use of the mower and with minimal cost of manufacture.

There has been a long felt desire in the art for an apparatus which can utilize a single motor for multiple implements, which allows easy conversion between implements, is simplistic in design and which does not have protruding rotating parts.

SUMMARY

It is an object of the present invention to provide a portable modular implement system which utilizes a conventional mower, and motor, whereby various implements can be reversibly mounted on the mower with minimal alteration to the mower or motor.

It is another object of the present invention to provide a system for reversibly attaching an implement to a mower wherein the safety of the mower is not compromised if the implement is absent.

It is another object of the present invention to provide a modular implement system wherein the moving parts are inaccessible with, or without, the implement being employed.

These and other advantages, as will be realized, are provided in a portable modular implement system. The system comprises a power source which comprises a motor. The motor comprises a crank shaft with an upper end and a lower end. A casing is attached to the motor exterior to the upper end of the crankshaft. The casing further comprises a void. An implement assembly comprising an implement bracket is reversibly attached to the power source. An implement is attached to the implement bracket. The implement comprises an implement drive shaft wherein the implement drive shaft protrudes through the void and couples with the crankshaft below the casing when the implement bracket is attached to the power source.

Yet another embodiment is provided in an adapter kit for reversibly attaching an implement to an upper end of the crank shaft of a mower motor to form a modular implement system. The adapter kit comprises an implement bracket wherein the implement bracket comprises a support member. An implement is attached to the implement bracket. The implement comprises an implement drive shaft protruding from the implement. An attachment device is provided for securing the implement bracket to the mower wherein the attachment device reversibly secures the support member. When the attachment device secures the support member the implement drive shaft protrudes reversibly into the motor. A fly wheel nut is provided which is capable of attaching to the upper end of the crank shaft and receiving the implement drive shaft.

Yet another embodiment is provided in a portable modular implement system. The system comprises a mower comprising a frame with a motor attached to the frame. The motor comprises a crank shaft with a lower end protruding below the frame and an upper end above the frame. A casing is provided wherein the upper end of the crank shaft is interior to the casing. An implement bracket is reversibly attached to the mower above the frame. An implement is attached to the implement bracket wherein the implement comprises an implement drive shaft protruding through the casing and wherein the implement drive shaft is co-linear with the drive shaft and coupled with the upper end of the crank shaft interior to the casing.

Yet another embodiment is provided in a portable modular implement system. The system comprises a power source comprising a motor which comprises a crank shaft. The crankshaft comprises an upper end and a lower end. A casing is attached to the motor and is exterior to the upper end of the crankshaft. The casing further comprises a void and a couple. The system further comprises an implement assembly comprising an upper plate and a lower plate wherein an implement is attached to the upper plate. A slidably releasable attachment is attached to the upper plate and the lower plate wherein when the upper plate and the lower plate are in a first position the slidably releasable attachment is capable of reversibly receiving the couple and when the upper plate and the lower plate are in a second position the couple is secured in the slidably releasable attachment. The implement comprises an implement drive shaft wherein the implement drive shaft protrudes through the void and is rotational secured to the upper end.

DETAILED DESCRIPTION

The present invention provides a portable modular implement system which allows various implements to be rapidly, and reversibly, attached to a motor without the primary function of the motor being disturbed. Furthermore, the motor has no additional external moving parts since the implement attachment is designed such that the mechanical couple is interior to the casing and the implement bracket prohibits access to the moving parts by human appendages.

The present invention will be described by reference to the figures which form a part of the disclosure and are intended to represent the preferred features of the invention without limitation to any embodiment illustrated therein. Similar elements are numbered accordingly.

Figure 1:
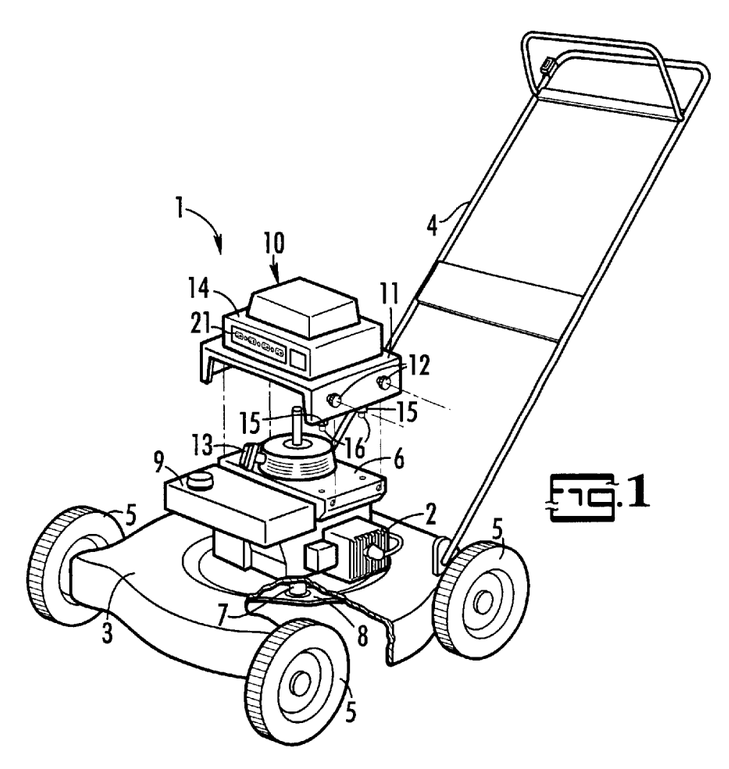
FIG. 1 is a front perspective, partial cutaway view, of an embodiment of the present invention.

An embodiment of the present invention is provided in partial cut-away front perspective view in FIG. 1. In FIG. 1 the portable modular implement system is generally represented at 1. The portable modular implement system comprises a power source comprising a motor, 2, which is secured to a frame, 3. The frame, 3, provides a location for securing the motor with the lower end of the crank shaft, 7, extending below the frame. A preferred embodiment is illustrated wherein the frame, 3, is a mower deck as known in the art of lawn mowers. Attached to the lower end of the crank shaft, 7, of the motor, 2, is a conventional blade, 8. It is well known that the blade is rotated by the motor thereby cutting vegetation. A handle, 4, extending upward from the frame, 3, allows the modular implement system to be moved by a user (not shown). Wheels, 5, preferably at the corners of the frame, 3, are provided for mobility. The motor, 2, comprises a casing, 6, which encloses portions of the motor such as the flywheel, recoil start mechanism, etc. A fuel tank, 9, stores and supplies fuel to the motor. The lower end of the crank shaft refers to the portion of the crank shaft that extends beyond the casing and is typically relied on to supply power. The upper end of the crank shaft refers to the terminal portion of the crank shaft which is interior to the motor, or casing, and attached to the flywheel directly or through a mechanical drive mechanism. It would be apparent that a vertical or horizontal shaft motor would be suitable for the teachings herein with the upper and lower end still defined relative to the crank shaft.

Reversibly attached to the power source is an implement assembly, 10. The implement assembly comprises a implement bracket, 11, which is reversible secured to the power source. In a particularly preferred embodiment the implement bracket is reversibly secured to the casing as will be described in more detail herein. Secured to the implement bracket is an implement, 14. The implement is a machine which, when rotated, does work. Particularly preferred implements are selected from a group consisting of generators, fluid pumps and other accessory items. Generators can provide direct current or they may be an alternator supplying alternating current. The implement bracket preferably attaches directly above the flywheel, not shown, of the motor as will be realized from further descriptions herein. In a particularly preferred embodiment the implement bracket is secured to the casing by threaded members, 12, such as a threaded rod comprising a knurled knob. The implement bracket preferably allows access to a pull handle, 13, of the recoil start mechanism if one is present. It would be apparent that motors comprising a starter, such as an electric starter, may not have a pull handle. The implement, 14, comprises an output, 21. The embodiment illustrated in FIG. 1 comprises an implement which is a generator or alternator and the output, 21, would be electrical receptacle as would be realized from the description herein.

Figure 2:
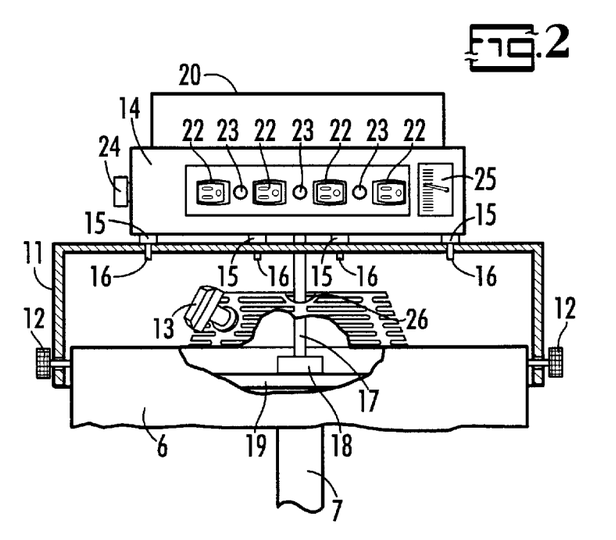
FIG. 2 is a partial cutaway front view of an embodiment of the present invention.

A partial front view of an embodiment of the present invention is provided in FIG. 2. In FIG. 2, the implement bracket, 11, is secured to the casing, 6, by a pair of threaded knurled knobs, 12. The implement, 14, is secured to the implement bracket, 11, by optional, but preferred, mounts, 15. The mounts may be rigid or they may be rubberized to dampen vibrations generated by the motor during use. In one embodiment the implement is secured to the implement bracket by securing members, 16, such as threaded members, rivets and the like which are received by a matching thread void in the implement. Each mount encompasses a threaded member and is compressed between the implement and the implement bracket. Protruding from the implement, 14, is an implement drive shaft, 17. The implement drive shaft, 17, protrudes through a void, 26, of the casing, 6, and is coupled directly to a fly wheel nut, 18, the fly wheel nut is in the interior of the casing, 6, which is defined as the portion of motor below the upper extent of the casing. The fly wheel nut is secured to the top of the crank shaft, 7, preferably above the flywheel, 19. The fly wheel nut, 18, rotates with the crank shaft, 7, of the motor. The fly wheel nut couples the rotation of the crank shaft, 7, with the implement drive shaft, 17, thereby driving the implement at the same rotational rate as the rotational rate of the motor. The fly wheel nut may receive the implement drive shaft or the implement drive shaft may receive the fly wheel nut. In a particularly preferred embodiment the implement drive shaft is a solid rod and the fly wheel nut receives the implement drive shaft therein. For the purposes of the present invention the fly wheel and implement drive shaft are directly coupled which means that there is no pulley/belt, or gear combinations but the rotation of the implement drive shaft is coordinated directly with the crank shaft of the motor. The implement, 14, may comprise a dynamo, 20, which converts rotational energy to direct current or alternating current electrical energy. The electrical energy is then accessible at an output, 21, comprising electrical receptacles, 22. Optional, but preferred fuses, 23, are provided to insure that the circuitry is not overloaded. A switch, 24, may be provided to open and close the circuitry to the receptacles. A meter, 25, may be provided as would be realized to one of ordinary skill in the art.

A particular utility of the inventive device is realized by referring to FIG. 2. The implement assembly can be easily removed, or mounted to, the power source. The threaded members, 12, are removed and the implement assembly is lifted upward thereby disengaging the implement drive shaft from the fly wheel nut and the implement from the power source. The power source is then a conventional mower with no upper crank shaft protruding from the casing. To reattach the implement assembly the implement drive shaft is lowered through the void, 26, and engaged with the fly wheel nut, 18. The threaded members, 12, are then inserted through receiving voids of the implement bracket and engaged with a threaded receiving void of the casing.

The mower is a conventional mower modified to receive the implement assembly. As realized from FIG. 2, the motor is modified to comprise a void, 26, which is aligned with the crankshaft; an implement drive shaft receiver, such as a fly wheel nut, which receives the implement drive shaft and a threaded void in the casing to receive the threaded member. This modification can be provided in a kit wherein the casing and flywheel nut are supplied or the flywheel nut and modified casing can be included during manufacture with minimal increase in cost of the motor or mower.

Figure 3:
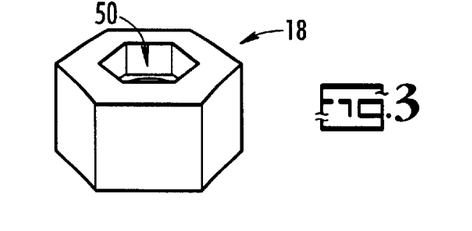
FIG. 3 is a top perspective view of a preferred fly wheel nut of the present invention.
Figure 4:
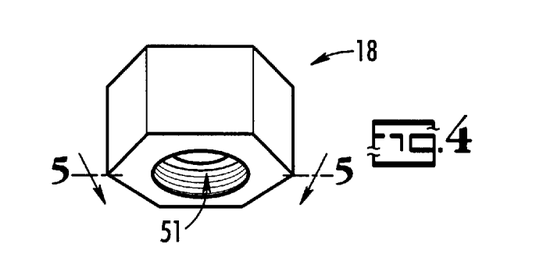
FIG. 4 is a bottom perspective view of a preferred fly wheel nut of the present invention.
Figure 5:
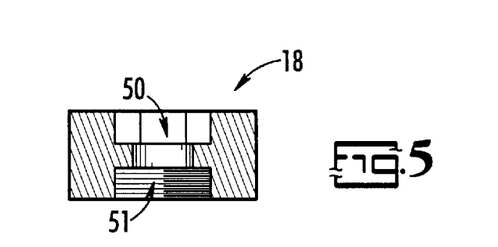
FIG. 5 is a partial cutaway view of the fly wheel nut of FIGS. 3 and 4.

A preferred flywheel nut is provided in FIGS. 3–5. The flywheel nut is shown in top perspective view in FIG. 3, in bottom perspective view in FIG. 4 and partial cut-away side view on FIG. 5. The flywheel nut preferably comprises a threaded cylindrical bore, 51, partially through the nut which is secured to the upper end of the crank shaft. The flywheel nut further comprises a polygonal bore, 52, which receives the implement drive shaft. The threaded cylindrical bore and polygonal bore are colinear such that the crank shaft and implement drive shaft rotate about a common axis.

Figure 6:
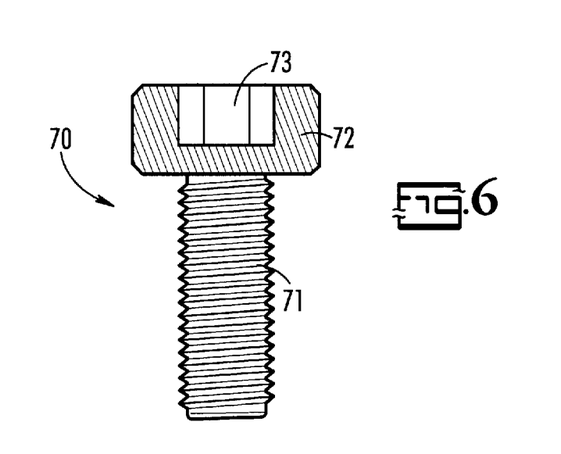
FIG. 6 is a partial cutaway view of a fly wheel bolt.

An alternate implement drive shaft receiver, which is a fly wheel bolt as illustrated in FIG. 6. Flywheel bolts and nuts are both utilized in the art without distinction and merely represent two equivalent embodiments with the choice made there between based on cost, manufacturing simplicity, or conformity with existing products to minimize parts in inventory. It would be understood that the present invention will work equally well without regard for the use of a flywheel nut or flywheel bolt. A preferred flywheel bolt is illustrated in FIG. 6 and generally represented at 70. The flywheel bolt comprises a threaded elongated member, 71, which is rotationally received by a matching threaded bore in the crankshaft. The head, 72, of the flywheel bolt comprises a recession, 73, which receives the implement drive shaft. It would be understood to one of ordinary skill in the art that the crankshaft could have a bore therein or be shaped to be received by a receiving bore of the implement drive shaft. Flywheel nuts and bolts are provided herein since this is in accordance with the currently practiced art. Current art does not necessarily provide a crankshaft bore, or crankshaft capable of being received, in the manner described herein.

Figure 7:
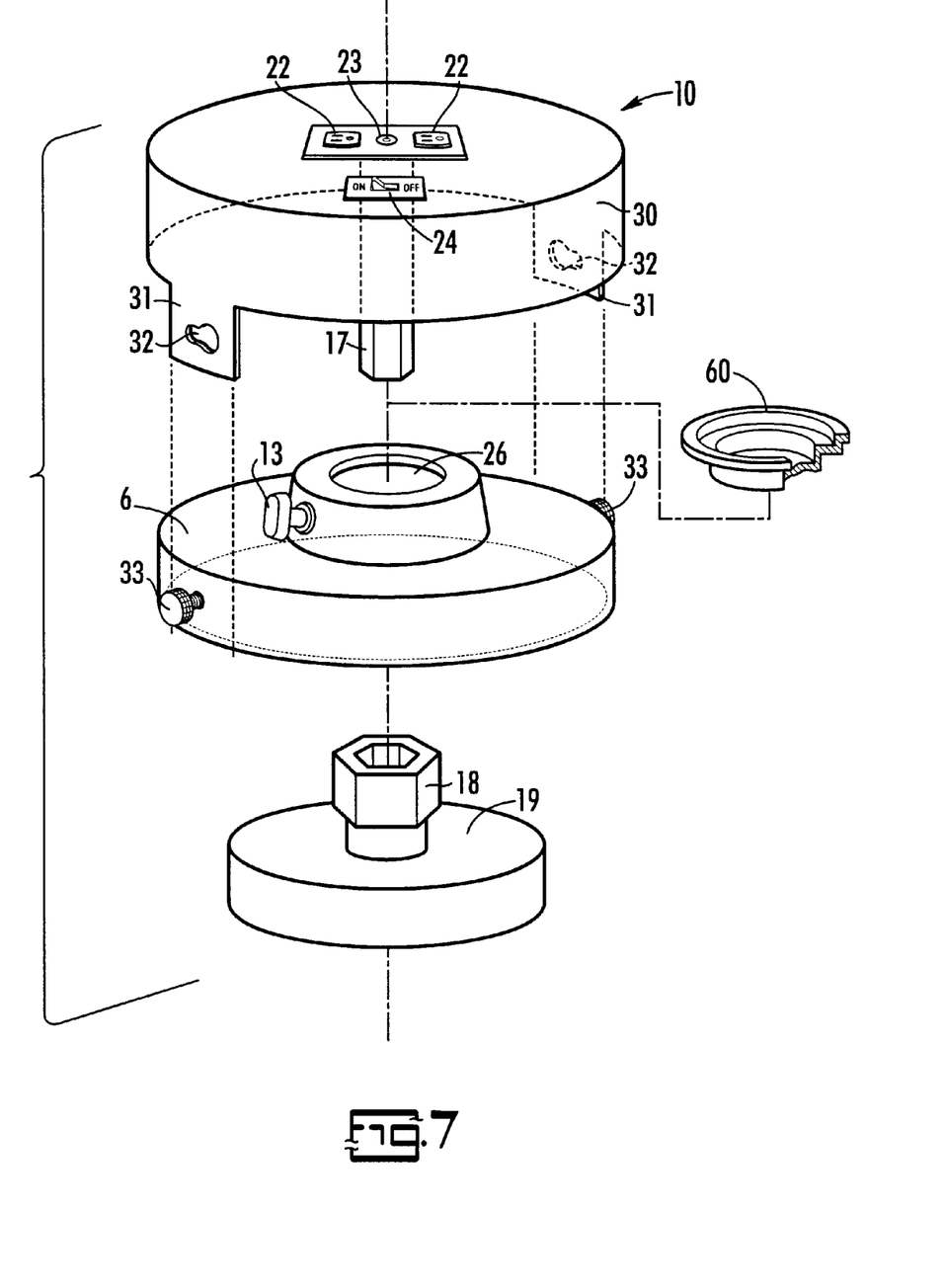
FIG. 7 is an exploded view of an embodiment of the present invention.

A partial exploded view of an embodiment of the present invention is provided in FIG. 7. In FIG. 7, the implement assembly, 10, comprises an implement and implement bracket which are integral one to the other. This embodiment is a preferred embodiment wherein the implement casing, 30, encases the working components of the implement therein. Furthermore, the implement casing, 30, comprises support members, 31, which support the implement assembly. The support members, 31, which extend downward preferably comprise key-slot voids, 32. The key-slot voids, 32, mate with mounting pegs, 33, on the casing which comprise a head and a post. The larger portion of the key slot void receives the head of the mounting peg. The implement assembly is then twisted clockwise to secure the post in the smaller portion of the key slot void. It would be apparent that the direction of rotation for securing is the same as the direction of rotation of the motor during operation. The implement drive shaft, 17, is inserted into the void, 26, and engaged with the fly wheel nut, 18, which secures the fly wheel, 19, to the crank shaft of the motor. It would be apparent that the implement drive shaft, 17, and crank shaft are preferably co-linear. An optional cap, 60, is provided for covering the void when the implement is not used. The cap is reversibly received by the void as would be realized.

The implement drive shaft, 17, is preferably a solid rod. The implement drive shaft is preferably polygonal, most preferably trigonal, square, pentagonal, hexagonal or octagonal. A hexagonal implement drive shaft is most preferred due to the rotational symmetry and the readily available supply of hexagonal shafts which are commonly formed into hex wrenches and the like. A hexagonal shaft is also preferred due to the large number of rotational degrees of freedom which will allow the shaft to easily slide into the fly wheel nut, flywheel bolt or be engaged directly with the crank shaft. The fly wheel nut, or flywheel bolt, preferably comprises a recession which readily receives the implement drive shaft and rotatably couples with the implement drive shaft to insure no rotational slip between the two elements. A hexagonal slot is preferred due to the strength associated with a hexagonal shaft inserted in a hexagonal slot. A twelve sided rotational symmetrical shape, as commonly employed in a twelve point socket, can be successfully utilized for the purposes of the present invention.

Figure 8:
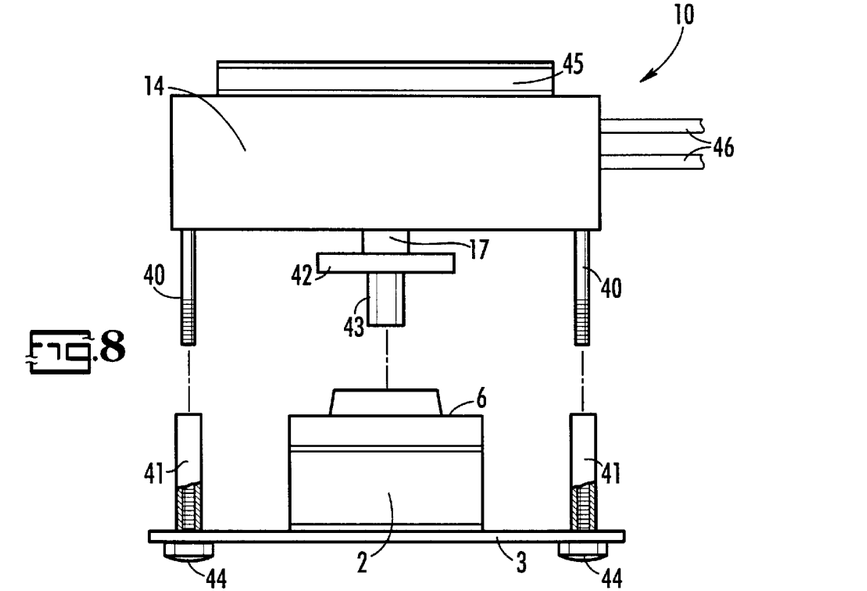
FIG. 8 is an exploded view of an embodiment of the present invention.

A particularly preferred embodiment is provided in FIG. 8. In FIG. 8, the implement assembly, 10, comprises support legs, 40, which extend downward from the implement. The support legs, 40, are received by mounting legs, 41, which are hollow legs for receiving the support legs of the implement assembly. It would be apparent from the description that the support legs could receive the mounting legs without departing from the spirit or scope of the invention. Hollow mounting legs are preferred since this allows the mounting legs to be mounted directly to the frame by inserting threaded members, 44, through the frame, 3, to be rotationally received by mating threads on the interior of the mounting legs. The implement assembly, 10, comprises an implement, 14, such as a fluid pump. The implement drive shaft, 17, comprises an optional centrifugal clutch, 42, which couples the implement drive shaft, 17, to a secondary implement drive shaft, 43. The secondary implement drive shaft, 43, then couples with the fly wheel nut, not shown. A centrifugal clutch is advantageous for allowing the motor to be started at low rotational speeds without the added drag of the implement. Once the motor is started the rotational speed can be increased to engage the centrifugal clutch thereby coupling the rotation of the implement drive shaft to the rotation of the motor. The implement may further comprise an optional reservoir, 45. The reservoir may store hydraulic fluid which is pumped by the implement through pipes, 46. The pipes may also be used to draw fluid from one location for movement to another as would be the case if the fluid pump were used as a water pump. The reservoir may also store air to provide a buffer. The buffer may then be maintained within a range of pressures by the implement. This allows the fluid in the buffer to be used while the implement is off. The implement can be restarted to refill the reservoir as would be commonly employed when used as an air compressor. Fluid refers to liquid or gaseous material including air, water, hydraulic fluid and the like.

Figure 9:
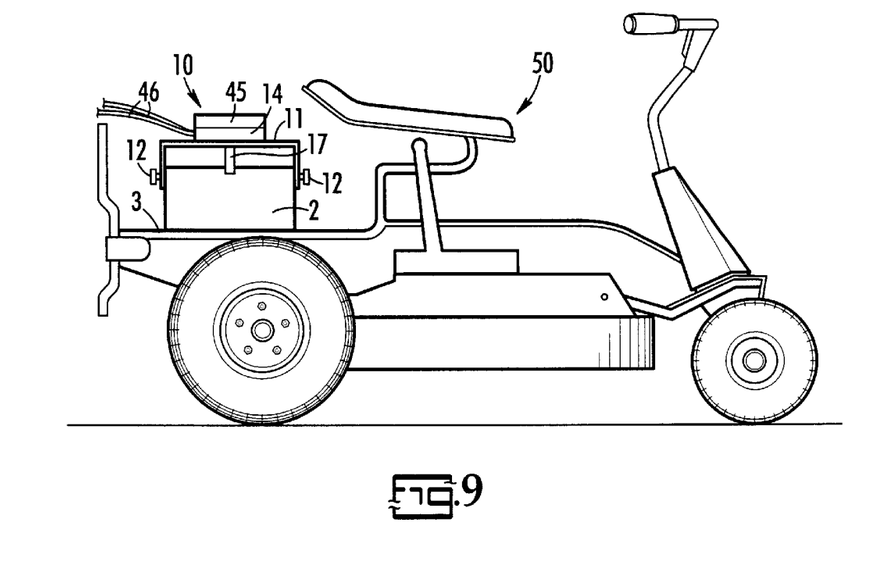
FIG. 9 is an embodiment of the present invention as utilized with a riding mower.

A particularly preferred embodiment is provided in FIG. 9. In FIG. 9, the portable modular implement system, 50, comprises a power source which is a riding mower as well known in the art. The implement assembly, 10, comprises an implement bracket, 11, attached to the motor, 2, by threaded members, 12. The motor, 2, is further attached to a frame, 3, which corresponds to a structural element of the riding mower. The implement, 14, has in operative association therewith an optional reservoir, 45, which contains fluids for supply to pipes, 46. In an alternate embodiment the implement may be a generator, with the pipes, 46, representing electrical conduits such as wires.

Figure 10:
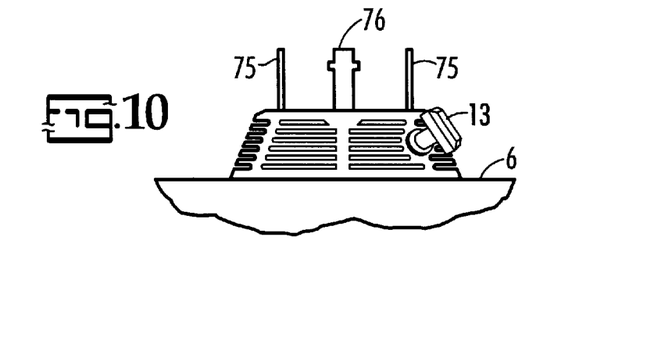
FIG. 10 is a side partial view of a preferred embodiment of the present invention.

A side view of a particularly preferred mounting is provided in FIG. 10. In FIG. 10, the upper extent of the casing, 6, comprises at least one guide element, 75. The guide element, 75, serves two predominant purposes. One purpose is to guide the insertion of the implement drive shaft into the appropriate position. The second purpose is to prohibit the implement assembly from rotating. In a particularly preferred embodiment the guide element, 75, is an elongated element secured to the top of the casing, 6. In another particularly preferred embodiment the guide element, 75, comprises a pair of parallel elongated elements secured to the upper extent of the casing, 6. Further secured to the upper extent of the casing, 6, is a coupling, 76, for receiving a slidably releasable attachment as will be further described herein. The implement drive shaft is received by the coupling, 76, as will be realized from further discussions herein.

Figure 11:
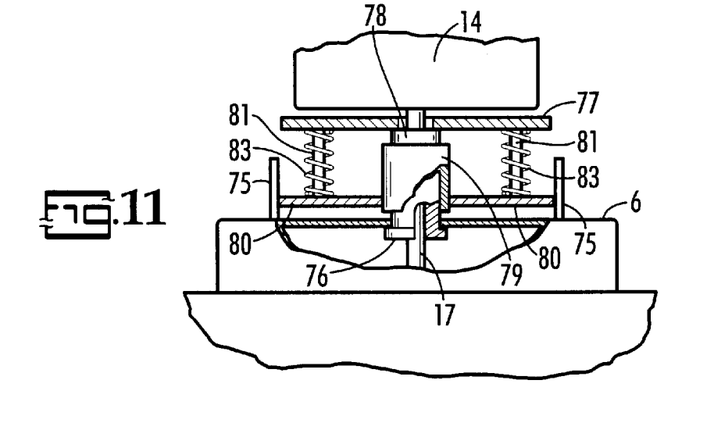
FIG. 11 is a front, partial cutaway view, of a preferred embodiment of the present invention.

FIG. 11 illustrates a partial cutaway side view of a preferred embodiment of the present invention wherein an implement assembly is attached to a power source. The implement, 14, is secured to an upper plate, 77. Also attached to the upper plate, 77, opposite to the implement, 14, is an inner barrel, 78, of a slidably releasable attachment. The coupling, 76, is received in the inner barrel, 78, of the slidably releasable attachment. An outer barrel, 79, of a slidably releasable attachment, is slidably attached to the inner barrel secures the coupling, 76, in the inner barrel when the outer barrel, 79, is in locked position. When the outer barrel slides upward to a release position the hollow fitting is released from the inner barrel. A lower plate, 80, is attached to the outer barrel, 79. It would be apparent that moving the lower plate towards the upper plate also moves the outer barrel, 79, towards the release position thereby allowing the implement to be removed from the power source in a very efficient manner. The lower plate abuts the guide element, 75. It would be apparent that the abutment of the lower plate with the guide element aligns the implement drive shaft, 17, with the crank shaft, not shown. The guide element, 75, also prohibits the lower plate, 80, from rotating which, in turn, may prohibit the implement assembly from rotating. In one embodiment auxiliary mounting elements, 81, are provided between the upper plate, 77, and lower plate, 80. The auxiliary mounting elements may provide support. Optional springs, 83, surrounding the auxiliary mounting elements may be provided to insure that the upper plate and lower plate are pursuaded away from each other thereby insuring that the outer barrel remains in the locked position during use. Alternatively, the spring biasing mechanism employed in the slidably releasable attachment may be of sufficient strength to allow the springs, 83, to be eliminated. In another embodiment the guides, 75, are sufficiently high to abut the upper plate.

Figure 12:
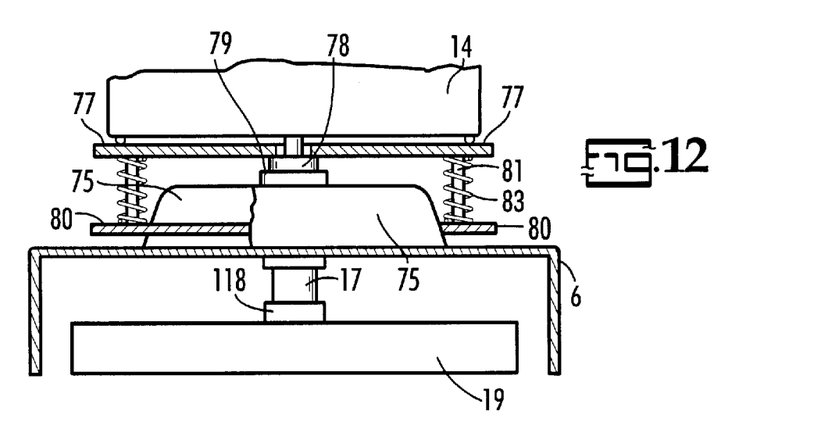
FIG. 12 is a side, partial cutaway view, of the embodiment of FIG. 11.

FIG. 12 illustrates a partial cutaway front view of the embodiment of FIG. 11. In FIG. 12, the implement, 14, is attached to the upper plate, 77. The inner barrel, 78, is also attached to the upper plate, 77, opposite to the implement. The outer barrel, 79, which is slidably attached to the inner barrel, 78, is attached to the lower plate, 80. The lower plate, 80, is prohibited from rotating by the guides, 75. To remove the implement assembly, the lower plate, 80, and upper plate, 77, are pursuaded towards each other counter the biasing of the slidably releasable attachment and the optional springs, 83. As the lower plate, 80, and upper plate, 77, are pursuaded towards each other the outer barrel, 79, slides to a release position thereby allowing the coupling, not shown, to disengage with the inner barrel. The entire implement assembly is then lifted until the implement drive shaft, 17, disengages with the securing element, 118, of the fly wheel, 19. To reattach the implement assembly the upper plate and lower plate are pursuaded towards each other. The implement drive shaft is inserted through the coupling and engaged with the securing element, 118. The position of the implement assembly may be directed by alignment with the guide element, 75. When the coupling is received by the inner barrel the upper plate and lower plate are allowed to separate due to the biasing of the various springs thereby locking the coupling in the inner barrel.

Figure 13:
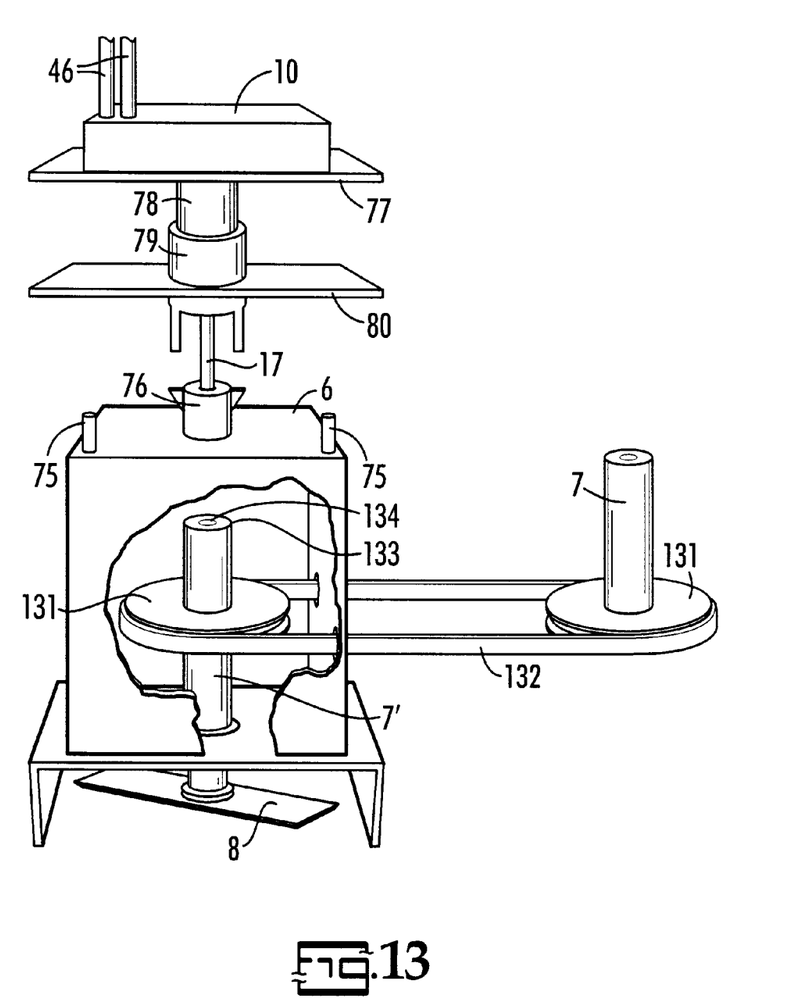
FIG. 13 is a partial cutaway perspective view of an embodiment of the present invention.

An alternate embodiment is illustrated in FIG. 13. In FIG. 13, the crank shaft, 7 is in two portions, 7 and 7', connected one to the other with a drive mechanism comprising a pair of pulleys, 131, and a belt, 132. It is particularly preferred that the pulleys comprise a V-groove within which a conventional belt fits. Chains and sprockets, or a conventional spindle assembly, could also be used as would be realized to one of ordinary skill in the art. The upper end, 133, of the crank shaft, 7', comprises a receiving void, 134, for receiving the implement drive shaft, 17. It would be within the scope of the present invention to provide an implement drive shaft with a void for receiving the crank shaft, 7'. A casing, 6, encloses the crank shaft, 7', to insure that the operator can not readily place an appendage in close proximity to the rotating crank shaft. A coupling, 76, aligned with the crank shaft, 7', receives the implement drive shaft, 17. A slidably releasable attachment comprising an outer barrel, 79, and inner barrel, 78, secures the implement to the couple with the implement drive shaft engaged with the crank shaft, 7'. A lower plate, 80, and upper plate, 77, are provided as described relative to FIGS. 11 and 12. The implement, 10, comprises pipes, 46, which may transport electricity, fluid, etc. A blade, 8, is secured to the lower end of the crank shaft, 7', as previously described.

A slidably releasable attachment comprises a female element comprising an inner barrel and an outer barrel. The outer barrel is slidably attached to the exterior of the inner barrel. The inner barrel is capable of reversibly receiving a coupling when the outer barrel is in a first release position but the coupling is secured therein when the outer barrel is in a second locked position. A spring mechanism is typically included to bias the outer barrel towards the locked position. These slidably releasable attachments are well known in the art for attaching fluid devices, such as hydraulic systems, air systems and the like and are widely commercially available. Slidably releasable attachments are also referred to in the art as hydraulic fittings or quick disconnect couplings. An Aeroquip, FD56—Series 10, coupling has been determined to be particularly suitable for demonstration of the teachings herein.

The invention has been described with particular emphasis on the preferred embodiments. It would be apparent that other embodiments could be realized without departing from the scope of the invention which is set forth in the claims that follow.

What is claimed is:

1. A portable modular implement system comprising:
    a power source comprising:
        a motor comprising a crank shaft wherein said crankshaft comprises an upper end and a lower end; and
        a casing attached to said motor and exterior to said upper end of said crankshaft wherein said casing further comprises a void; and
    an implement assembly comprising:
        an implement bracket reversibly attached to said power source;
        an implement attached to said implement bracket wherein said implement comprises an implement drive shaft wherein said implement drive shaft protrudes through said void and couples with said crankshaft by a slidably releasable attachment below said casing when said implement bracket is attached to said power source.

2. The portable modular implement system of claim 1 wherein said implement is selected from a group consisting of generator and fluid pump.

3. The portable modular implement system of claim 1 wherein said implement bracket reversibly attaches to said casing.

4. The portable modular implement system of claim 3 wherein said casing comprises a mounting peg and said implement bracket comprises a key slot for receiving said mounting peg.

5. The portable modular implement system of claim 1 wherein said implement bracket comprises at least one mounting leg and said power source comprises at least one support leg.

6. The portable modular implement system of claim 5 wherein said support leg receives said mounting leg.

7. The portable modular implement system of claim 1 wherein said implement drive shaft comprises a clutch and a secondary implement drive shaft.

8. The portable modular implement system of claim 1 wherein said implement drive shaft and said crank shaft are colinear.

9. The portable modular implement system of claim 1 wherein said implement bracket comprises an upper plate wherein said implement is attached to said upper plate;
    a lower plate; and
    said slidably releasable attachment is attached to said upper plate and said lower plate wherein when said upper plate and said lower plate are in a first position said slidably releasable attachment is capable of reversibly receiving a couple and when said upper plate and said lower plate are in a second position said couple is secured in said slidably releasable attachment.

10. The portable modular implement system of claim 9 wherein in said first position said upper plate and said lower plate are closer than when in said second position.

11. The portable modular implement system of claim 9 wherein said coupling is attached to said power source.

12. An adapter kit for reversibly attaching an implement to an upper end of a crank shaft of a motor of a mower to form a modular implement system comprising:
    an implement bracket wherein said implement bracket comprises a support member;
        an implement attached to said implement bracket wherein said implement comprises an implement drive shaft protruding from said implement;
        a slidably releasable attachment device for securing said implement bracket to said mower wherein said attachment device reversibly secures said support member and when said attachment device secures said support member, said implement drive shaft protrudes reversibly into said motor; and
    a fly wheel nut capable of attaching to said upper end of said crank shaft and receiving said implement drive shaft.

13. The adapter kit of claim 12 wherein said implement is selected from a group consisting of generator and fluid pump.

14. The adapter kit of claim 12 further comprising a casing comprising a void for receiving said implement drive shaft.

15. The adapter kit of claim 12 wherein said implement drive shaft is a solid polygonal drive shaft and said flywheel nut receives said solid polygonal drive shaft.

16. The adapter kit of claim 12 wherein said attachment device is a threaded member which is received by a receiving void in said implement bracket and said mower comprises a threaded void for receiving said threaded member.

17. The adapter kit of claim 12 wherein said attachment device comprises a coupling which is reversibly received by a slidably releasable attachment of said implement bracket.

18. A portable modular implement system comprising:
    a mower comprising a frame and a motor attached to said frame;
        said motor comprises a crank shaft with a lower end protruding below said frame and an upper end above said frame;
        a casing wherein said upper end of said crank shaft is interior to said casing;
    an implement bracket reversibly attached to said mower above said frame; and
        an implement attached to said implement bracket wherein said implement comprises an implement drive shaft protruding through said casing and wherein said implement drive shaft is co-linear with said drive shaft and coupled with said upper end of said crank shaft by a slidably releasable attachment interior to said casing.

19. The portable modular implement system of claim 18 wherein said implement is selected from a group consisting of generator and fluid pump.

20. The portable modular implement system of claim 18 wherein said implement is a generator.

21. The portable modular implement system of claim 18 wherein said implement drive shaft is hexagonal.

22. The portable modular implement system of claim 18 wherein said implement bracket is reversibly attached to said frame.

23. The portable modular implement system of claim 18 wherein said mower comprises a cutting element.

24. A portable modular implement system comprising:
a power source comprising:
at least one crank shaft wherein said crankshaft comprises an upper end and a lower end; and
a couple aligned with said upper end of said crankshaft; and
an implement assembly comprising:
an implement;
a slidably releasable attachment secured to said implement wherein said slidably releasable attachment is capable of reversibly receiving said couple; and
wherein said implement comprises an implement drive shaft wherein said implement drive shaft protrudes through said couple and is rotational secured to said upper end.

25. The portable modular implement system of claim 24 further comprising:
a casing exterior to said upper end of said crankshaft wherein said couple is attached to said casing; and
said implement assembly further comprises:
an upper plate wherein said implement is attached to said upper plate;
a lower plate;
a slidably releasable attachment attached to said upper plate and said lower plate wherein when said upper plate and said lower plate are in a first position said slidably releasable attachment is capable of reversibly receiving said couple and when said upper plate and said lower plate are in a second position said couple is secured is said slidably releasable attachment.

26. The portable modular implement system of claim 24 wherein said implement assembly comprises springs to bias said slidably releasable attachment to a position which inhibits removal of said couple from said slidably releasable attachment.

27. The portable modular implement system of claim 24 further comprising at least one guide element.

* * * * *